(12) United States Patent
Hayes et al.

(10) Patent No.: US 6,698,557 B2
(45) Date of Patent: Mar. 2, 2004

(54) BRAKE DRUM COOLING APPARATUS

(75) Inventors: Brian D. Hayes, Newark, OH (US); Robert J. Martin, III, Newark, OH (US); Dean M. House, Pataskala, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/228,774

(22) Filed: Aug. 27, 2002

(65) Prior Publication Data

US 2003/0047394 A1 Mar. 13, 2003

Related U.S. Application Data

(60) Provisional application No. 60/318,431, filed on Sep. 10, 2001.

(51) Int. Cl.[7] .................... F16D 55/02; B60B 19/10
(52) U.S. Cl. .................... 188/264 AA; 188/264 R; 188/218 A; 301/6.3
(58) Field of Search .................. 188/218 R, 218 XL, 188/218 A, 264 R, 264 A, 264 AA, 264 F, 264 N, 71.6; 301/6.3

(56) References Cited

U.S. PATENT DOCUMENTS

| | | | | |
|---|---|---|---|---|
| 4,043,434 A | * | 8/1977 | Braschler | 188/296 |
| 4,135,764 A | * | 1/1979 | Johnson et al. | 301/6.3 |
| 4,577,734 A | * | 3/1986 | Williams | 188/218 R |
| 4,674,606 A | * | 6/1987 | Denton | 188/264 R |
| 5,320,201 A | * | 6/1994 | White | 188/264 A |
| 5,383,537 A | * | 1/1995 | White | 188/78 |
| 5,538,114 A | * | 7/1996 | White et al. | 188/218 R |
| 5,820,203 A | * | 10/1998 | Morelli et al. | 296/180.1 |
| 5,964,323 A | * | 10/1999 | Henry | 188/264 R |
| 6,155,650 A | * | 12/2000 | Barger | 301/6.3 |
| 6,296,086 B1 | * | 10/2001 | Reuber et al. | 188/218 A |
| 6,364,071 B2 | * | 4/2002 | Aydt | 188/70 R |

FOREIGN PATENT DOCUMENTS

| | | | |
|---|---|---|---|
| EP | 0028989 A1 | * | 5/1981 |
| JP | 58203239 A | * | 11/1983 |
| JP | 59110927 A | * | 6/1984 |
| JP | 60164027 A | * | 8/1985 |
| JP | 60205030 A | * | 10/1985 |
| JP | 1190568 A | * | 7/1989 |

* cited by examiner

Primary Examiner—Jack Lavinder
Assistant Examiner—Melody M. Burch
(74) Attorney, Agent, or Firm—Carlson, Gaskey & Olds

(57) ABSTRACT

A brake drum assembly includes an impeller and stator that help cool the brake drum. The impeller and stator combination are especially suited for low-speed vehicle operations. The impeller includes a plurality of impeller vanes formed about the circumference of the impeller that draw cooling air across the brake drum. The impeller is mounted to an external surface of the brake drum for rotation with the drum about an axis of rotation. The stator is held fixed with respect to the drum and includes a first portion that forms a circular band, which is positioned in an overlapping relationship to the impeller, and a second portion that is transverse to the first portion. The second portion extends radially inwardly toward the axis of rotation to form a vertical face. A plurality of stator vanes are formed within the vertical face that direct the airflow away from the brake drum toward an inboard direction that is generally parallel to the axis of rotation.

19 Claims, 3 Drawing Sheets

BRAKE DRUM COOLING APPARATUS

CROSS REFERENCE TO RELATED APPLICATIONS

This application claims priority to U.S. Provisional Application No. 60/318,431, which was filed on Sep. 10, 2001.

BACKGROUND OF THE INVENTION

This invention relates to a method and apparatus for cooling a brake drum. Specifically, an impeller is mounted to a brake drum and a non-rotating stator is mounted in an overlapping relationship with the impeller to improve brake cooling for vehicles having low speed duty cycles.

Brake drum temperatures can become excessive for vehicles with low speed duty cycles, such as garbage trucks and buses, for example. These types of vehicles have duty cycles that typically include a significant amount of stops and starts over a short period of time. Further, these vehicles usually do not operate at uninterrupted higher speeds for any significant amount of time. Thus, the brake drum and other associated brake components can become overheated. Excessive and extreme temperatures can reduce brake component life and can adversely affect vehicle performance.

Brake cooling mechanisms such as fins and drum turbines have been incorporated into brake drums to provide increased cooling for the brake components. For example, a drum turbine uses a separate stamped piece that is mounted to the external surface of the drum. The stamped piece includes a plurality of vanes formed about the circumference of the brake drum that help direct heated air away from the drum. The vanes are formed to direct air radially outward from the external surface of the drum. However, these brake cooling mechanisms may not perform adequately in low speed applications. In some low speed applications, these brake fins or drum turbines can actually increase the temperature of the brake drum, which is undesirable.

For the above reasons, it would be desirable to provide a method and apparatus for improving brake cooling during low speed, high stop and start applications, in addition to overcoming other deficiencies in the prior art as outlined above.

SUMMARY OF THE INVENTION

The invention is directed toward a method and apparatus for cooling a brake assembly. The brake assembly includes a brake drum with an impeller mounted for rotation with the brake drum about an axis of rotation. A non-rotating stator is held fixed relative to the drum. Cooling external air is drawn in an inboard direction across an external surface of the brake drum via the impeller and the heated air is directed away from the brake drum in an inboard direction generally parallel to the axis of rotation by the stator.

In the preferred embodiment, the brake assembly includes the brake drum that has an inner cavity defining a braking surface. The impeller is mounted for rotation with the brake drum and has a plurality of impeller vanes formed about the circumference of the impeller. The stator is preferably mounted to an axle and does not rotate with the brake drum. The stator includes a first portion for directing airflow across an external surface of the brake drum and a second portion having a plurality of stator vanes that direct the airflow away from the brake drum in a direction generally parallel to the axis of rotation.

The first portion is preferably a circular band that is positioned in an overlapping relationship to the impeller. The second portion, which is integrally formed with the first portion as a single piece, is formed transversely with respect to the first portion and extends radially inwardly toward the axis of rotation to define a vertical face. The stator vanes are formed within the vertical face. Preferably, each stator vane includes at least one tab member that extends outwardly from the vertical face. Each stator vane is positioned at a unique radial position on the vertical face relative to the axis of rotation.

The subject invention provides an impeller and stator combination that draws external cooling air across the brake drum and toward an inboard direction of the vehicle to maximize the cooling effect. These and other features of the present invention can be best understood from the following specifications and drawings, the following of which is a brief description.

DETAILED DESCRIPTION OF A PREFERRED EMBODIMENT

Figure 1:
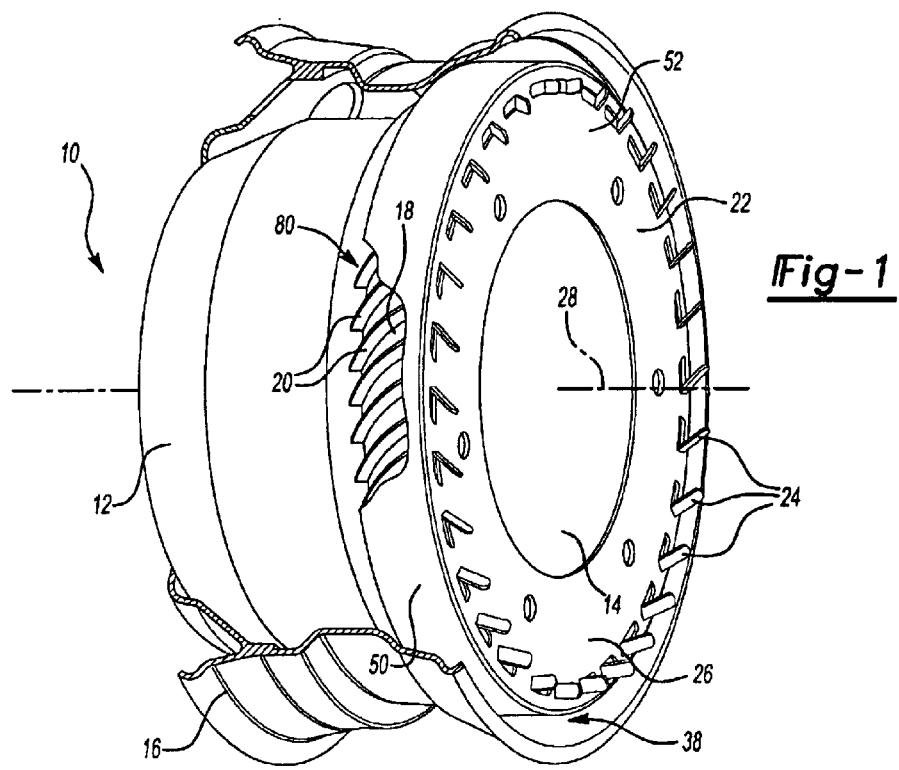
FIG. 1 is an inboard perspective view of a wheel assembly incorporating the subject invention and showing the wheel and stator partially cut-away.

A wheel assembly is shown at 10 in FIG. 1. The wheel assembly 10 includes a brake drum 12 that includes an inner brake cavity that defines a braking surface 14. The brake drum 12 is mountable within a wheel 16. An impeller 18 is mounted to the brake drum 12 and includes a plurality of impeller vanes 20 that draw airflow across the brake drum 12. A stator 22 is mounted in an overlapping relationship to the impeller 18 and includes a plurality of stator vanes 24 extending outwardly from a vertical face 26 of the stator 22. The impeller 18 is mounted for rotation with the brake drum 12 about an axis of rotation 28. The stator 22 is non-rotating and is positioned in an overlapping relationship to the impeller 18.

Figure 2:
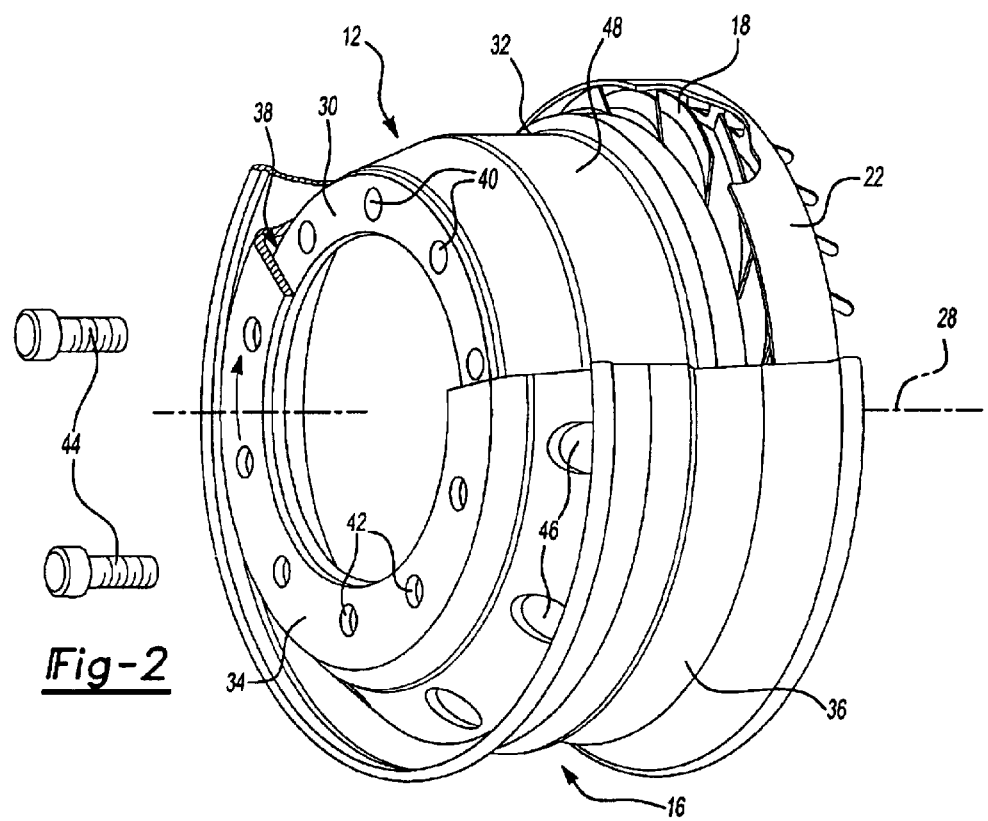
FIG. 2 is an outboard perspective view of the wheel assembly of FIG. 1.

As shown in FIG. 2, the brake drum 12 includes an outboard end 30 (facing a direction outward of a vehicle) and an inboard end 32 (facing a direction toward the center of a vehicle). The impeller 18 is mounted to the inboard end 32 of the brake drum 12.

The wheel 16 includes an outboard end face 34 and a circular walled portion 36 that supports a tire as known in the art. The end face 34 and circular walled portion 36 together define a wheel cavity 38. The brake drum 12, impeller 18, and stator 22 are mounted within the wheel cavity 38. A first plurality of bolt holes 40 are formed in the outboard end 30 of the brake drum 12 and a second plurality of bolt holes 42 are formed in the outboard end face 34 of the wheel 16. The first 40 and second 42 bolt holes are aligned and a plurality of fasteners 44 are inserted through the holes 40, 42 to fasten the wheel 16 to the brake drum 12. Any type of fastener known in the art can be used.

A plurality of hand holes or air inlets 46 are formed in the outboard end face 34 about the circumference of the wheel 16. The air inlets 46 are positioned at various radial positions relative to the axis of rotation 28. As the wheel 16 and brake drum 12 rotate, the impeller 18 draws cooling external air in through the inlets 46 and across an external surface 48 of the brake drum 12.

The stator 22 includes a first portion comprising a circular band 50 and a second portion comprising a flanged member 52 extending transverse to the circular band 50 in a direction radially inwardly toward the axis of rotation 28 to define the vertical face 26. The circular band 50 is positioned in an overlapping relationship to the impeller 18. The circular band 50 is defined by a diameter that is greater than the diameter of the impeller 18 such that the circular band 50 is spaced apart from the impeller vanes 20 to allow unimpeded rotation of the impeller vanes 20 under the circular band 50.

The stator vanes 24 are formed within the vertical face 26. Each stator vane 24 includes at least one tab member 54 that extends outwardly from the vertical face 26. Each stator vane 24 is also positioned at a unique, predefined radial position about the vertical face 26 relative to the axis of rotation 28. The tab members 54 are preferably stamped out of the vertical face 26 to form a plurality of openings 56 in the vertical face 26. The stator 22 directs heated air away from the brake drum 12 in a direction generally parallel to the axis of rotation 28 via these openings 56 as the impeller 18 rotates with the brake drum 12.

The stator 22 is preferably incorporated into an existing dust shield that is installed near the inboard end of the wheel assembly 10. The stator 22 is preferably produced by extending an edge of a standard dust shield around the impeller 18 and adding stator vanes 24 to the vertical face of the dust shield. This combination of features achieves an overall effect similar in concept to that of a single stage axial compressor commonly used in gas turbine engines. Air is drawn from the outside, across the brake drum 12, and directed inboard away from the wheel area. This "outside-in" flow direction ensures that the coolest possible ambient air is used for cooling.

Figure 3:
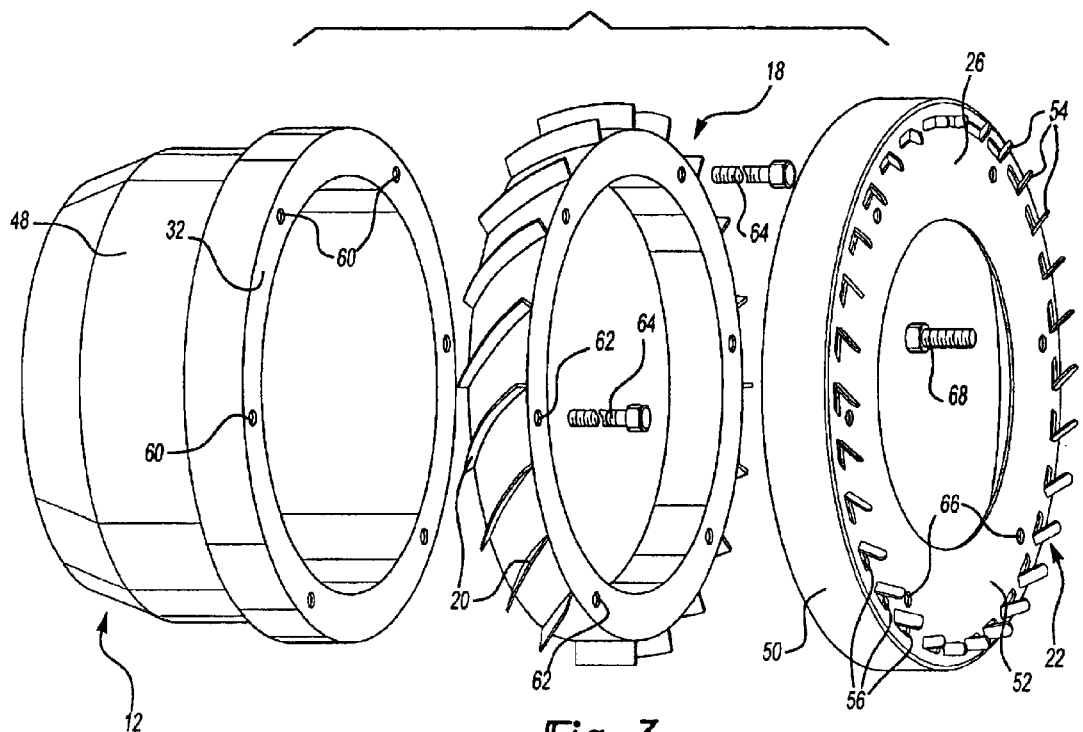
FIG. 3 is an exploded view of the brake drum, stator and impeller assembly as shown in FIG. 1.

As shown in FIG. 3, a plurality of holes 60 are formed at the inboard end 32 of the brake drum 12. A plurality of holes 62 are formed within an edge face of the impeller 18. The holes 60, 62 are aligned and a plurality of fasteners 64 are inserted into the holes 60, 62 to attach the impeller 18 to the brake drum 12. The impeller 18 is positioned such that the impeller vanes 20 overlap a portion of the external surface 48 of the brake drum with a flange portion with the holes 62 extending inwardly toward the axis of rotation.

A plurality of holes 66 are formed with the vertical face 26 of the stator 22 at a position radially inward from the stator vanes 24. A plurality of fasteners 68 (only one is shown) are inserted through the holes 66 to attach the stator 22 to a stationary, i.e., non-rotating, vehicle structure. Preferably the stator is mounted to a non-rotating axle component, such as an axle housing for example. The impeller 18 and stator 22 can be bolted on, as shown in FIG. 3, or can be attached by other attachment methods known in the art.

Figure 4:
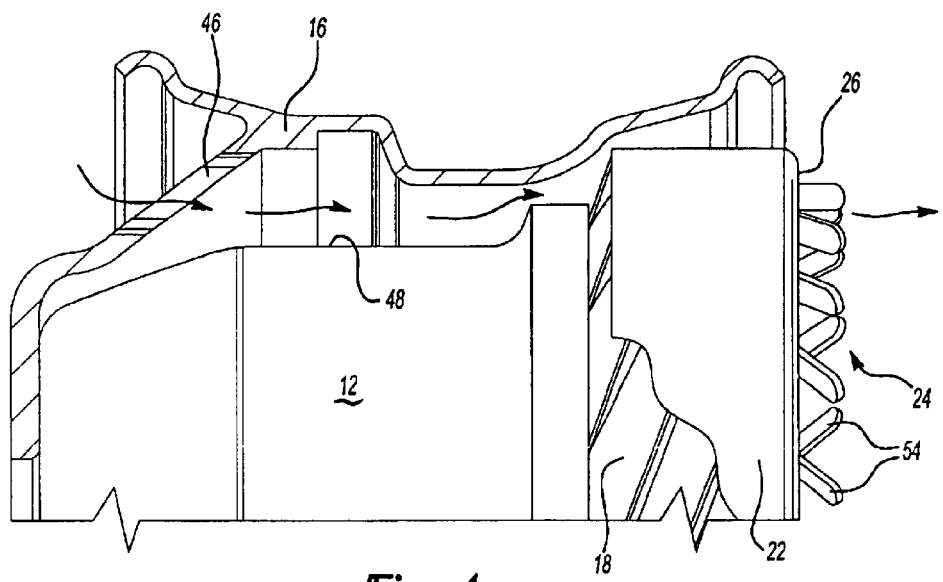
FIG. 4 is a cross-sectional view of the assembly of FIG. 1.

The airflow direction is shown in FIG. 4. External air is draw in through the air inlets 46 in the wheel 16 and across the external surface 48 of the brake drum 12 as the impeller 18 rotates. The circular band portion 50 of the stator 22 further directs the air in a generally linear direction and the openings 56 in the vertical face portion 26 direct the air in an inboard direction generally parallel to the axis of rotation 28.

Figure 5:
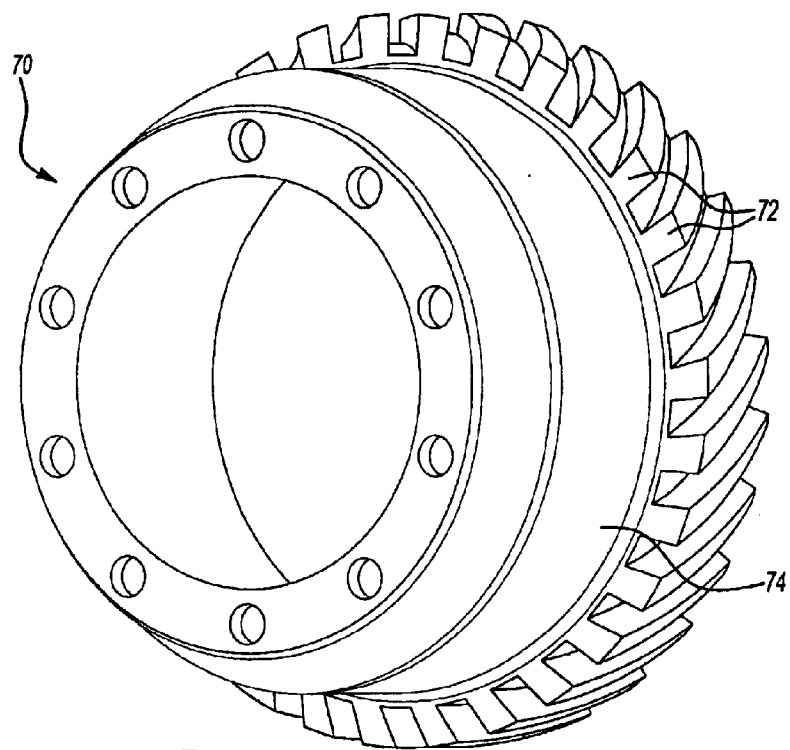
FIG. 5 is a perspective view of one embodiment of the impeller.

One embodiment of an impeller is shown in FIG. 5. In this embodiment the impeller is cast integrally with the brake drum 12 to form a single piece impeller and drum assembly 70. Impeller vanes 72 are cast about the circumference of an inboard end 74 of the impeller and drum assembly 70.

Figure 6:
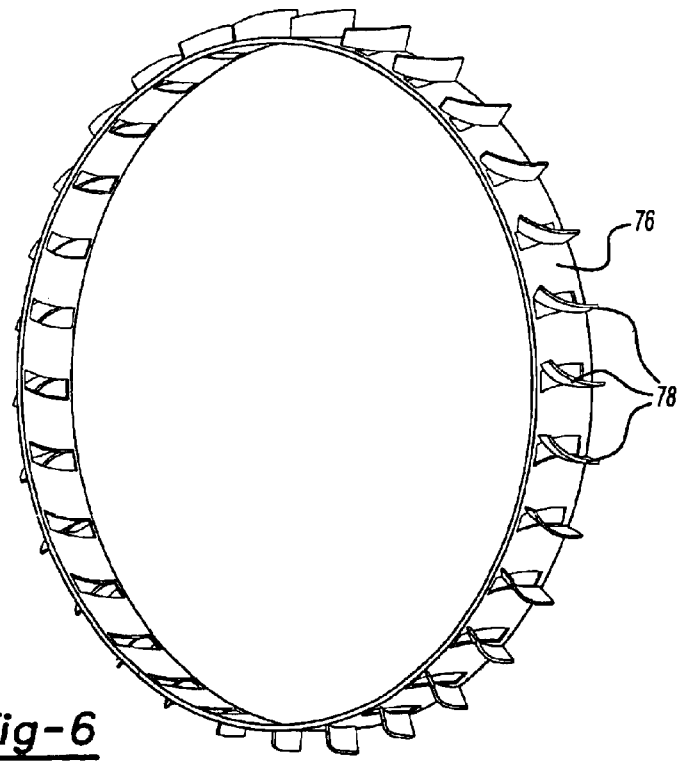
FIG. 6 is a perspective view of an alternate embodiment of the impeller.

An alternate embodiment of an impeller is shown in FIG. 6. In this embodiment, the impeller is formed as a stamped member 76 that is attached to a squealer band section shown generally at 80 in FIG. 1, of the drum 12. Vanes 78 are stamped out about the circumference of the member 76. When a separate impeller component 76 is utilized, the impeller 76 is preferably constructed from a stamped flat pattern of sheet metal.

In either embodiment, me impeller vanes 20, 72, 78 extend upwardly and outwardly from the outer surface of the brake drum 12 in the squealer band area 80 and extend about the outer periphery of the brake drum 12. The impeller vanes 20, 72, 78 each include upper and lower ends that are interconnected by a curved flow surface. Each vane 20, 72, 78 extends from one edge of the squealer band 80 to an opposite edge of the band 80. Preferably, the upper and lower ends of each vane 20, 72, 78 are not collinear across the horizontal width of the band 80.

The combination of the stator 22 and impeller 18 provides improved airflow over the brake drum 12 during low speed operations, such as in transit or refuse vocations. The impeller 18 also acts as a set of cooling fins and is preferably formed from an aluminum alloy or other high-conductivity material. The wrap around dust shield serves to greatly improve impeller efficiency as well as providing a radiant heat shield for the inner tire bead.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A brake assembly comprising:
    a brake drum having an inner cavity defining a braking surface;
    an impeller mounted for rotation with said brake drum about an axis of rotation, said impeller having a plurality of impeller vanes formed about the circumference of said impeller; and
    a non-rotating stator held fixed relative to said brake drum, said stator including a first portion for directing airflow across an external surface of said brake drum and a second portion having a plurality of stator vanes for directing the airflow away from said brake drum in a direction generally parallel to said axis of rotation.

2. An assembly according to claim 1 wherein said first portion of said stator comprises a circular band overlaying and spaced apart from said impeller vanes and said second portion of said stator comprises a flanged portion formed transversely to said circular band and extending radially inwardly toward said axis of rotation to define a vertical face.

3. An assembly according to claim 2 wherein said stator vanes are formed within said vertical face with each of said stator vanes being positioned at a predefined radial position relative to said axis of rotation.

4. An assembly according to claim 3 wherein each of said stator vanes comprises at least one tab member extending transversely to said vertical face to define a plurality of openings within said vertical face forming a conduit for directing heated air in an inboard direction away from said brake drum.

5. An assembly according to claim 2 wherein said impeller is integrally formed about said external surface of said brake drum such that said impeller and said brake drum are a single piece.

6. An assembly according to claim 2 wherein said impeller comprises a separate stamped member mounted to a squealer band portion formed about said external surface of said brake drum.

7. An assembly according to claim 2 wherein said impeller is fastened to said brake drum with a plurality of fasteners.

8. An assembly according to claim 1 including a wheel having an outboard end face and an inner wheel cavity wherein said brake drum is mounted to said wheel generally within said inner wheel cavity for rotation about said axis of rotation.

9. An assembly according to claim 8 wherein said outboard end face includes a plurality of openings formed about the circumference of said wheel for guiding cooling external air drawn in by said impeller vanes across said brake drum.

10. A brake assembly comprising:
a wheel defining an inner wheel cavity and having a plurality of openings circumferentially formed about an outboard face of said wheel;
a brake drum mounted for rotation with said wheel about an axis of rotation and positioned generally within said inner wheel cavity;
an impeller mounted for rotation with said brake drum and having a plurality of impeller vanes formed about the circumference of said impeller; and
a non-rotating stator including a first portion positioned in an overlapping relationship to said impeller and a second portion having a plurality of stator vanes wherein cooling external air is drawn in through said openings and across an external surface of said brake drum by said impeller with said stator vanes directing the airflow away from said brake drum in an inboard direction generally parallel to said axis of rotation.

11. An assembly according to claim 10 wherein said first and second portions are integrally formed as a single piece with said first portion comprising a circular band and said second portion comprising a flanged portion formed transversely to said circular band and extending radially inwardly toward said axis of rotation to define a vertical face.

12. An assembly according to claim 11 wherein each of said stator vanes comprises at least one tab member extending transversely to said vertical face and positioned at a unique radial position relative to said axis of rotation to define a plurality of openings within said vertical face for directing heated air toward an inboard direction away from said brake drum.

13. An assembly according to claim 12 wherein said impeller is integrally formed about said external surface of said brake drum such that said impeller and said brake drum are a single piece.

14. A method for cooling a brake drum during low-speed vehicle operations comprising the steps of:
providing a brake assembly including a brake drum, an impeller mounted for rotation with the brake drum about an axis of rotation and a non-rotating stator having a plurality of stator vanes at least partially overlapping the impeller;
drawing cooling external air in an inboard direction across an external surface of the brake drum with the impeller; and
directing heated air away from the brake drum in an inboard direction generally parallel to the axis of rotation with the stator vanes.

15. A method according to claim 14 including the steps of forming the stator with a circular band portion and a transversely extending portion extending radially inwardly toward the axis of rotation to define a vertical face, positioning the circular band portion in an overlapping relationship to the impeller, and forming a plurality of stator vanes in the vertical face to direct heated air away from the brake drum.

16. A method according to claim 15 including the steps of forming each of the stator vanes with at least one tab member extending transversely to the vertical face and positioning each tab at a unique radial position relative to the axis of rotation to define a plurality of openings within the vertical face for directing heated air toward an inboard direction away from the brake drum.

17. A method according to claim 15 including the steps of mounting the brake drum within an inner cavity of a wheel and drawing external cooling air in through a plurality of openings formed within the wheel with the impeller toward the external surface of the brake drum.

18. A method according to claim 17 including the step of forming a plurality of impeller vanes about the circumference of the impeller.

19. A method according to claim 17 including the step of integrally forming the impeller and the brake drum as a single piece.

* * * * *